US010904049B1

(12) United States Patent
Kaklin

(10) Patent No.: US 10,904,049 B1
(45) Date of Patent: Jan. 26, 2021

(54) TIME DOMAIN DISCRETE TRANSFORM COMPUTATION

(71) Applicant: STMicroelectronics (Research & Development) Limited, Buckinghamshire (GB)

(72) Inventor: Filip Kaklin, Edinburgh (GB)

(73) Assignee: STMicroelectronics (Research & Development) Limited, Buckinghamshire (GB)

( * ) Notice: Subject to any disclaimer, the term of this patent is extended or adjusted under 35 U.S.C. 154(b) by 0 days.

(21) Appl. No.: 16/508,796

(22) Filed: Jul. 11, 2019

(51) Int. Cl.
*H04N 19/625* (2014.01)
*H04L 25/49* (2006.01)
*H04N 5/378* (2011.01)
*H04N 19/63* (2014.01)

(52) U.S. Cl.
CPC ......... *H04L 25/4902* (2013.01); *H04N 5/378* (2013.01); *H04N 19/63* (2014.11)

(58) Field of Classification Search
CPC .... H04L 25/4902; H04N 19/63; H04N 5/378; H04N 19/91; H04N 19/93; G06F 17/14; G06F 17/141; G06F 17/145; G06F 17/147; G06F 17/148
See application file for complete search history.

(56) References Cited

U.S. PATENT DOCUMENTS

| 3,981,443 A | 9/1976 | Lynch et al. |
| 4,038,539 A | 7/1977 | Van Cleave |
| 4,261,043 A | 4/1981 | Robinson et al. |
| 4,446,530 A | 5/1984 | Tsuboka |
| 4,590,608 A | 5/1986 | Chen et al. |
| 4,982,353 A | 1/1991 | Jacob et al. |
| 5,262,871 A | 11/1993 | Wilder et al. |
| 5,768,434 A | 6/1998 | Ran |
| 5,815,608 A | 9/1998 | Lange et al. |
| 5,850,622 A | 12/1998 | Vassiliou et al. |
| 6,157,740 A | 12/2000 | Buerkle et al. |
| 6,181,823 B1 | 1/2001 | Takahashi |

(Continued)

FOREIGN PATENT DOCUMENTS

| EP | D151614 B1 | 8/1985 |
| EP | 0796006 A1 | 9/1997 |

OTHER PUBLICATIONS

Dadda, L., "Composite Parallel Counters", IEEE Transactions on Computers, vol. C-29, No. 10, Oct. 1980, 5 Pages.

(Continued)

*Primary Examiner* — David S Huang
(74) *Attorney, Agent, or Firm* — Slater Matsil, LLP

(57) ABSTRACT

In accordance with embodiments, a first counter of a plurality of counters of an apparatus receives a plurality of pulse width signals in the time domain. The first counter generates a first increment signal in the time domain from the plurality of pulse width signals based on a first row of a Discrete Transform matrix. A synchronizer of the apparatus receives the first increment signal. The synchronizer generates a first synchronized increment signal in the time domain from the first increment signal. A first accumulator of a plurality of accumulators of the apparatus receives the first synchronized increment signal. The first accumulator accumulates the first synchronized increment signal over a period of time to generate a first frequency domain signal.

24 Claims, 11 Drawing Sheets

(56) References Cited

U.S. PATENT DOCUMENTS

| | | | |
|---|---|---|---|
| 6,233,060 B1 | 5/2001 | Shu et al. | |
| 6,349,152 B1 | 2/2002 | Chaddha | |
| 8,385,387 B2 | 2/2013 | Nervig | |
| 8,928,775 B2* | 1/2015 | Lee .................... | H04N 9/735 348/223.1 |
| 10,158,375 B1 | 12/2018 | Carbajal Ipenza | |
| 2005/0122238 A1* | 6/2005 | Nomura ............... | G06N 3/063 341/53 |
| 2014/0146872 A1* | 5/2014 | Du ....................... | H04N 19/423 375/240.2 |
| 2014/0152871 A1* | 6/2014 | Campbell ............. | H04N 5/335 348/231.99 |
| 2018/0302150 A1 | 10/2018 | Chang | |

OTHER PUBLICATIONS

Leon-Salas, Walter D., et al., "A CMOS Imager with Focal Plane Compression", IEEE International Symposium on Circuits and Systems (ISCAS) 2006, pp. 3570-3573.

Shoushun, Chen, et al., "Adaptive-Quantization Digital Image Sensor for Low-Power Image Compression", IEEE Transactions on Circuits and Systems—I: Regular Papers, vol. 54, No. 1, Jan. 2007, pp. 13-25.

Malviya, Sunil, et al., "2D-Discrete Walsh Wavelet Transform for Image Compression with Arithmetic Coding", 4th International Conference on Computing, Communications and Networking Technologies (ICCCNT), Tiruchengode, India, Jul. 4-6, 2013, 4 pages.

\* cited by examiner

TIME DOMAIN DISCRETE TRANSFORM COMPUTATION

TECHNICAL FIELD

The present invention relates generally to a system and method for signal processing designs, and, in particular embodiments, to a transform computation apparatus and method.

BACKGROUND

Generally, a transform is a mathematical operation which maps signals between two different domains. For example, the Discrete Fourier Transform (DFT) maps sampled time domain signals to the frequency domain signals. The changed signal properties after a transform operation can be exploited for various purposes such as analysis of the signals. Many types of transforms exist. In another example, the Discrete Cosine Transform (DCT), which is the basis for Joint Photographic Experts Group (JPEG) compression, exploits the 2D image signal sparsity in the transformed domain. In yet another example, the Discrete Wavelet Transform (DWT), which is the basis for the JPEG2000 compressed image file format, discretely samples the wavelets. The Haar Wavelet Transform is one form of the DWT.

Calculating a transform is a computationally expensive task, often requiring a huge amount of processing operations, arithmetic blocks such as adders and/or multipliers, memory space, die area, and energy consumption. Thus, systems and methods that improve the calculation of transforms are desired. This disclosure relates to improvement of apparatus and method for calculation of various Discrete Transforms.

SUMMARY

In accordance with embodiments, a first counter of a plurality of counters of an apparatus receives a plurality of pulse width signals in the time domain. The first counter generates a first increment signal in the time domain from the plurality of pulse width signals based on a first row of a Discrete Transform matrix. A synchronizer of the apparatus receives the first increment signal. The synchronizer generates a first synchronized increment signal in the time domain from the first increment signal. A first accumulator of a plurality of accumulators of the apparatus receives the first synchronized increment signal. The first accumulator accumulates the first synchronized increment signal over a period of time to generate a first frequency domain signal.

In some embodiments, the plurality of counters may further comprise a second counter. The second counter may receive the plurality of pulse width signals in the time domain. The second counter may then generate a second increment signal in the time domain from the plurality of pulse width signals based on a second row of the Discrete Transform matrix. The synchronizer may receive the second increment signal. The synchronizer may then generate a second synchronized increment signal in the time domain from the second increment signal. The plurality of accumulators may further comprise a second accumulator. The second accumulator may receive the second synchronized increment signal. The second accumulator may then accumulate the second synchronized increment signal over the period of time to generate a second frequency domain signal.

In some embodiments, the number of the plurality of pulse width signals may equal a number of the plurality of counters. The plurality of counters may include N counters including the first counter, and an i-th counter of the plurality of counters may receive the plurality of pulse width signals in the time domain. The i-th counter may generate an i-th increment signal in the time domain from the plurality of pulse width signals based on an i-th row of the Discrete Transform matrix. The Discrete Transform matrix may be an N×N Discrete Transform matrix. The synchronizer may receive the i-th increment signal. The synchronizer may generate an i-th synchronized increment signal in the time domain from the i-th increment signal. The plurality of accumulators may further comprise N accumulators including the first accumulator. An i-th accumulator of the N accumulators may receive the i-th synchronized increment signal. The i-th accumulator may then accumulate the i-th synchronized increment signal over the period of time to generate an i-th frequency domain signal.

In some embodiments, the number of the plurality of counters may equal one of 4, 8, or 16. In some embodiments, the plurality of counters may process the plurality of pulse width signals in parallel. In some embodiments, the number of the plurality of counters may equal 4. The first row of the Discrete Transform matrix may be [1, 1, 1, 1]. The plurality of pulse width signals may comprise a first pulse width signal, a second pulse width signal, a third pulse width signal, and a fourth pulse width signal. The first increment signal may comprise an addition of the first pulse width signal, the second pulse width signal, the third pulse width signal, and the fourth pulse width signal in the time domain.

In some embodiments, the apparatus may further comprise a clock divider. The divider may set a first clock rate. The first clock rate may be a first fraction of a system clock rate. The clock divider may feed the first clock rate to the first accumulator through a first multiplexor. In some embodiments, the plurality of accumulators may further comprise N accumulators including the first accumulator. The clock divider may set an i-th clock rate. The i-th clock rate may be an i-th fraction of the system clock rate for an i-th accumulator of the N accumulators. The clock divider may feed the i-th clock rate to the i-th accumulator through an i-th multiplexor.

In some embodiments, the Discrete Transform matrix may be one of a Walsh matrix, or a Haar matrix.

In accordance with embodiments, a time domain Discrete Transform block of an apparatus receives N pulse width signals. The time domain Discrete Transform block generates N frequency domain signals. An output module of the apparatus stores or transmits information associated with the N frequency domain signals.

In some embodiments, the information associated with the N frequency domain signals may be the N frequency domain signals.

In some embodiments, the apparatus may further comprise a run length encoder. The run length encoder may run length encode the N frequency domain signals to generate run length encoded signals. The apparatus may further comprise an entropy encoder. The entropy encoder may entropy encode the run length encoded signals to generate entropy encoded signals. The information associated with the N frequency domain signals may be the entropy encoded signals.

In some embodiments, the N frequency domain signals may be N quantized frequency domain signals.

In some embodiments, the time domain Discrete Transform block may comprise N counters. An i-th counter of the N counters may receive the N pulse width signals in the time domain. The i-th counter of the N counters may generate an i-th increment signal in the time domain from the N pulse width signals based on an i-th row of a Discrete Transform matrix. The Discrete Transform matrix may be an N×N Discrete Transform matrix.

In some embodiments, the time domain Discrete Transform block may further comprise a synchronizer. The synchronizer may receive the i-th increment signal. The synchronizer may generate an i-th synchronized increment signal in the time domain from the i-th increment signal. The time domain Discrete Transform block may further comprise N accumulators. An i-th accumulator of the N accumulators may receive the i-th synchronized increment signal. The i-th accumulator of the N accumulators may accumulate the i-th synchronized increment signal over a period of time to generate an i-th frequency domain signal.

In some embodiments, N may be one of 4, 8, or 16. In some embodiments, the apparatus may comprise a plurality of N comparators. The plurality of N comparators may receive outputs from N pixels and generate the N pulse width signals from the N pixels.

In some embodiments, the apparatus may be an image sensor readout device.

The foregoing has outlined rather broadly the features of an embodiment of the present disclosure in order that the detailed description of the disclosure that follows may be better understood. Additional features and advantages of embodiments of the disclosure will be described hereinafter, which form the subject of the claims of the disclosure. It should be appreciated by those skilled in the art that the conception and specific embodiments disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale

DETAILED DESCRIPTION OF ILLUSTRATIVE EMBODIMENTS

This application relates to improvement of apparatus and method for discrete transform, such as the Walsh Transform. The Walsh Transform is also known as the Hadamard Transform, Walsh-Hadamard Transform, Hadamard-Rademacher-Walsh Transform, or Walsh-Fourier Transform. The goal of performing the Walsh Transform is to compress the signal by removing redundant data. The Walsh Transform itself is mathematically reversible and lossless.

Conventional methods for the Walsh Transform require the input to be already digitized. Such requirement assumes some form of analog-to-digital converter (ADC), or time-to-digital converter (TDC). The ADC and TDC typically have high power consumption.

Figure 1:
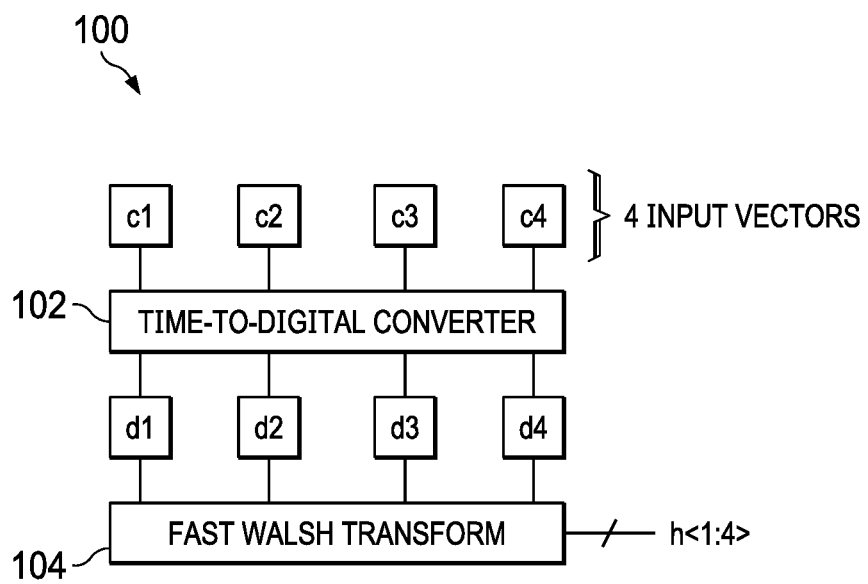
FIG. 1 illustrates a conventional system that performs the Walsh Transform.

FIG. 1 shows a conventional system 100 that performs the Walsh Transform using the Fast Walsh Transform algorithm. In the system 100, the Fast Walsh Transform module 104 takes digital signals and converts the digital signals to frequency domain signals h1, h2, h3, and h4. However, often times, the input vector comprises time domain signals, such as pulse width signals c1, c2, c3, and c4. Pulse width signals are commonly used to represent, in the time domain, light intensity incident on a pixel in an image sensor or voltage when combined with a voltage controlled delay unit (VCDU). So, a time-to-digital converter TDC 102 is required in the system 100. The TDC 102 converts the input signals c1, c2, c3, and c4 in the time domain to the digital signals d1, d2, d3, and d4, respectively. The digital signals d1, d2, d3, and d4 are digital representations of the input signals c1, c2, c3, and c4 in the time domain, respectively. Then, the Fast Walsh Transform module 104 takes the digital signals d1, d2, d3, and d4 and converts them into frequency domain signals h1, h2, h3, and h4 (labelled as h<1:4> in FIG. 1).

As explained above, the TDC and ADC typically have high power consumption. Also, like systems for many other types of transforms, the conventional system 100 for the Walsh Transform requires a huge amount of processing operations, arithmetic blocks, memory space, die area, and energy consumption. Embodiments of this disclosure provide methods and apparatuses for performing the Walsh Transform computation on the pulse width signals in the time domain during the conversion process. In so doing, embodiments of this disclosure provide technical improvement over the conventional Walsh Transform system by reducing the amount of processing operations, arithmetic blocks, memory usage, die area, and power consumption.

Figure 2A:
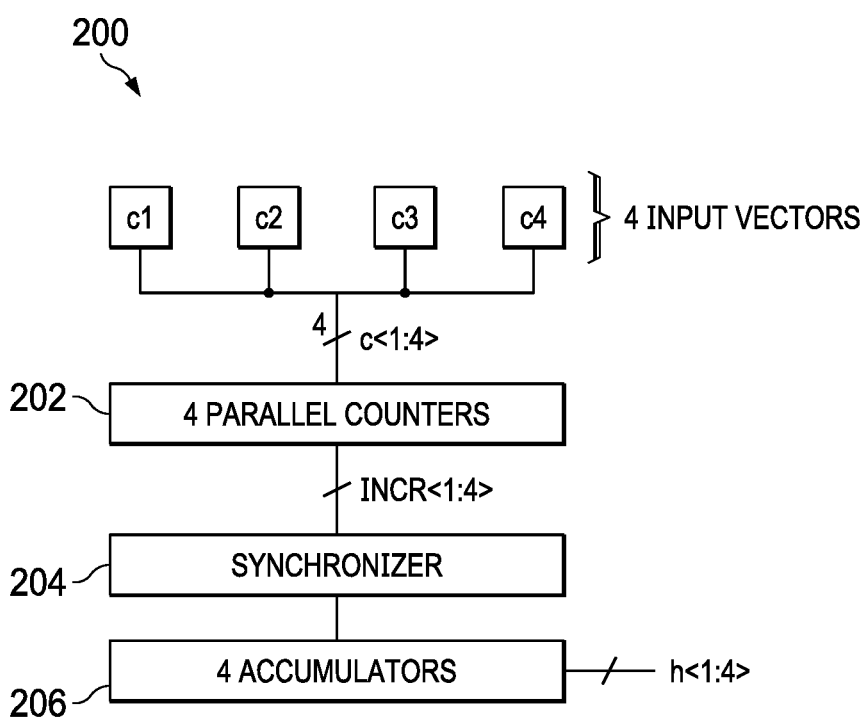
FIG. 2A illustrates a time domain Discrete Transform block (e.g., time domain Walsh Transform block or time domain Haar Wavelet Transform block) for improved Discrete Transform computation, according to some embodiments.

FIG. 2A shows a system 200 as an example time domain Discrete Transform block (e.g., time domain Walsh Transform block or time domain Haar Wavelet Transform block) for improved Walsh Transform computation, according to some embodiments. The system 200 comprises multiple parallel counters 202, a synchronizer 204, and multiple accumulators 206. The number of the parallel counters 202 and the number of the accumulators 206 depend on the number of the parallel input signals. For example, the system 200 may require N parallel counters 202 and N accumulators 206 for processing N parallel input signals.

For illustration purpose, FIG. 2A shows 4 parallel input signals, such as 4 parallel pulse width signals c1, c2, c3, and c4. So, the system 200 comprises 4 parallel counters 202 and 4 accumulators 206. FIG. 2A provides a non-limiting example embodiment system 200 for processing 4 parallel input signals. If there are 8 or 16 parallel input signals, the system 200 may comprise 8 parallel counters and 8 accumulators, or 16 parallel counters and 16 accumulators, respectively, and so on.

The input of each of the parallel counters 202 are all the parallel input signals (e.g., c1, c2, c3, and c4). Each of the parallel counters 202 takes all the parallel input signals and performs addition/subtraction to the parallel input signals according to the Walsh matrix. The Walsh matrix used depends on the number of parallel counters. For a system of N parallel counters for processing N parallel input signals, an N×N Walsh matrix is used. Specifically, the first counter performs addition/subtraction to the parallel input signals according to the first row of the Walsh matrix, the i-th counter performs addition/subtraction of the parallel input signals according to the i-th row of the Walsh matrix, and the N-th counter performs addition/subtraction to the parallel input signals according to the N-th row of the Walsh matrix. The output of each counter is an increment signal that is the digital representation of the result of addition/subtraction of the parallel input according to the corresponding row of the Walsh matrix.

FIG. 2A shows an example system 200 having 4 parallel counters taking 4 pulse width signals in the time domain (c1, c2, c3, and c4) as the input signals. So, each counter uses a corresponding row of the 4×4 Walsh matrix below to perform addition/subtraction of the pulse width signals c1, c2, c3, and c4.

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

The value 1 in an entry of the Walsh matrix indicates addition of the corresponding input pulse width signal, and the value −1 in an entry of the Walsh matrix indicates subtraction of the corresponding input pulse width signal. For example, the first counter of the parallel counters 202 uses the first row of the 4×4 Walsh matrix, [1 1 1 1]. So the first counter performs INCR1 increment signal INCR1, which is a digital representation of (c1+c2+c3+c4).

The second counter of the parallel counters 202 uses the second row of the 4×4 Walsh matrix, [1 −1 1 −1]. Because the first entry and the third entry of this row [1 −1 1 −1] are 1, the second counter performs addition for the first and the third input pulse width signals (c1 and c3). Also, because the second entry and the fourth entry of this row [1 −1 1 −1] are −1, the second counter performs subtraction for the second and the fourth input pulse signals (c2 and c4). That is, the output of the second counter is a generated second increment signal INCR2, which is the digital representation of (c1+c3−c2−c4).

The third counter of the parallel counters 202 uses the third row of the 4×4 Walsh matrix, [1 1 −1 −1]. Because the first entry and the second entry of this row [1 1 −1 −1] are 1, the third counter performs addition for the first and the second input pulse width signals (c1 and c2). Also, because the third entry and the fourth entry of this row [1 1 −1 −1] are −1, the third counter performs subtraction for the third and the fourth input pulse width signals (c3 and c4). That is, the output of the third counter is a generated third increment signal INCR3, which is the digital representation of (c1+c2−c3−c4).

The fourth counter of the parallel counters 202 uses the fourth row of the 4×4 Walsh matrix, [1 −1 −1 1]. Because the first entry and the fourth entry of this row [1 −1 −1 1] are 1, the fourth counter performs addition for the first and the fourth input pulse width signals (c1 and c4). Also, because the second entry and the third entry of this row [1 −1 −1 1] are −1, the fourth counter performs subtraction for the second and the third input pulse width signals (c2 and c3). That is, the output of the third counter is a generated a fourth increment signal INCR4, which is the digital representation of (c1+c4−c2−c3).

Embodiment systems using the Walsh matrix of another size can be designed similarly, as understood by people skilled in the art. For example, for an embodiment system of 8 parallel counters processing 8 parallel input pulse width signals (e.g., pulse width signals c1, c2, c3, c4, c5, c6, c7, and c8), each counter of the 8 parallel counters uses the corresponding row of the 8×8 Walsh matrix below.

$$\begin{bmatrix} 1 & 1 & 1 & 1 & 1 & 1 & 1 & 1 \\ 1 & -1 & 1 & -1 & 1 & -1 & 1 & -1 \\ 1 & 1 & -1 & -1 & 1 & 1 & -1 & -1 \\ 1 & -1 & -1 & 1 & 1 & -1 & -1 & 1 \\ 1 & 1 & 1 & 1 & -1 & -1 & -1 & -1 \\ 1 & -1 & 1 & -1 & -1 & 1 & -1 & 1 \\ 1 & 1 & -1 & -1 & -1 & -1 & 1 & 1 \\ 1 & -1 & -1 & 1 & -1 & 1 & 1 & -1 \end{bmatrix}$$

The 8 increment signals generated by the 8 parallel counters as understood by people skilled in the art, respectively, are shown below.

INCR1=c1+c2+c3+c4+c5+c6+c7+c8
INCR2=c1+c3+c5+c7−c2−c4−c6−c8
INCR3=c1+c2+c5+c6−c3−c4−c7−c8
INCR4=c1+c4+c5+c8−c2−c3−c6−c7
INCR5=c1+c2+c3+c4−c5−c6−c7−c8
INCR6=c1+c3+c6+c8−c2−c4−c5−c7
INCR7=c1+c2+c7+c8−c3−c4−c5−c6
INCR8=c1+c4+c6+c7−c2−c3−c5−c8

The system 200 is not limited to Walsh Transform computation. The same system 200 in FIG. 2A may be used to compute other forms of the discrete transform. For example, system 200 in FIG. 2A may be used to compute the Haar Wavelet Transform using the following 4×4 Haar matrix for a system with 4 parallel counters.

$$\begin{bmatrix} 1 & 1 & 1 & 1 \\ 1 & 1 & -1 & -1 \\ 1 & -1 & 0 & 0 \\ 0 & 0 & 1 & -1 \end{bmatrix}$$

The value 1 in an entry indicates addition of the corresponding input pulse width signal, the value −1 in an entry indicates subtraction of the corresponding input pulse width signal, and the value 0 in an entry indicates the corresponding input pulse width signal is not counted. The 4 increment signals generated by the 4 parallel counters for the Haar Wavelet Transform, respectively, are shown below.
INCR1=c1+c2+c3+c4
INCR2=c1+c2−c3−c4
INCR3=c1−c2
INCR4=c3−c4

For an embodiment system of 8 parallel counters processing 8 parallel input pulse width signals (e.g., pulse width signals c1, c2, c3, c4, c5, c6, c7, and c8), each counter of the 8 parallel counters uses the corresponding row of the 8×8 Haar matrix below.

$$\begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & 0 & 0 & 0 & 0 \\ 0 & 0 & 0 & 0 & 1 & 1 & -1 & -1 \\ 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 1 & -1 \end{bmatrix}$$

The 8 increment signals generated by the 8 parallel counters as understood by people skilled in the art, respectively, are shown below.
INCR1=c1+c2+c3+c4+c5+c6+c7+c8
INCR2=c1+c2+c3+c4−c5−c6−c7−c8
INCR3=c1+c2−c3−c4
INCR4=c5+c6−c7−c8
INCR5=c1−c2
INCR6=c3−c4
INCR7=c5−c6
INCR8=c7−c8

The outputs from the parallel counters 202 (i.e., increment signals) are integrated using the accumulators 206. Each of the accumulators 206 addition/subtraction of the corresponding increment signal over time to generate a frequency domain signal h.

The accumulator needs the increment signals to be synchronized. To reduce the complexity of the accumulators, a synchronizer 204 may be included between the parallel counters 202 and the accumulators 206. The input of the synchronizer 204 are the increment signals (e.g., INCR1, INCR2, INCR3, and INCR4) output by the parallel counters 202. The synchronizer 204 synchronizes on the increment signals and outputs the synchronized increment signals. Hardware and circuitry for performing signal synchronization are well known to people skilled in the art.

The input of the accumulators 206 are the synchronized increment signals. The accumulators 206 perform integration of the increment signals. Hardware and circuitry for the accumulator performing signal integration are well known to people skilled in the art.

The result of the integration is the outputs of the accumulators 206, which may be represented in two's complement. Two's complement is a mathematical operation on binary numbers. The two's complement is calculated by inverting the digits and adding one. For example, for a four-bit binary number 0001, the two's complement is 1111 (inversion of 0001 is 1110, and 1110 plus 1 is 1111). In FIG. 2A, the 4 outputs of the 4 corresponding accumulators 206 are the four frequency domain signals, h1, h2, h3, and h4, respectively, which are the same as the outputs as the Fast Walsh Transform Module 104 as shown in FIG. 1 (labeled as h<1:4> in both FIG. 1 and FIG. 2A).

As shown in FIG. 2A, the main difference between the embodiment system 200 and the conventional system 100 is that the system 200 combines time-to-digital conversion with the discrete transform computation (e.g., Walsh Transform computation or Haar Wavelet Transform computation). With the embodiment system and method described above, the increment signal generation and integration can be performed in the time domain.

As shown in FIG. 2A, there is no need for a TDC in the embodiment Walsh Transform block of the system 200 prior to the Walsh Transform block. Such embodiment technique reduces power consumption of the system over the conventional systems. The Walsh Transform encodes a signal as a sum of scalar components multiplied by corresponding rows of the Walsh Matrix. In some embodiments, accumulation operations only occur when an increment signal is not 0. For example, if the input signals are correlated, the increment signals are often 0. So, no accumulation is needed in these situations, which leads to further reduction of power consumption.

As described above, the goal of performing the Walsh Transform is to compress the signals by removing redundant data. In some cases (e.g. when the input signals relate to an image), the data redundancy depends on the signal spatial frequency, and the Walsh Transform splits the input signals by spatial frequency. Different frequencies can be quantized with different resolutions. The resolution of certain frequencies can be coarser when the corresponding data is less important.

FIG. 2A above illustrates a time domain computation system and method of the Walsh Transform taking pulse width signals as the input. Pulse width signals are added/subtracted according to rows in the Walsh matrix (using the parallel counters 202), and the results are integrated (using up/down accumulators 206). The output of the system 200 (e.g., h1, h2, h3, and h4) is a domain transformed representation of the original input pulse width signals (e.g., c1, c2, c3, and c4). If the system 200 is applied to appropriate input signals, the output can be sparse in the Walsh domain (i.e., the frequency domain), and therefore requiring less memory for storing information (lossless). In addition, the output can be suitable for further compression (e.g., lossy compression).

Figure 2B:
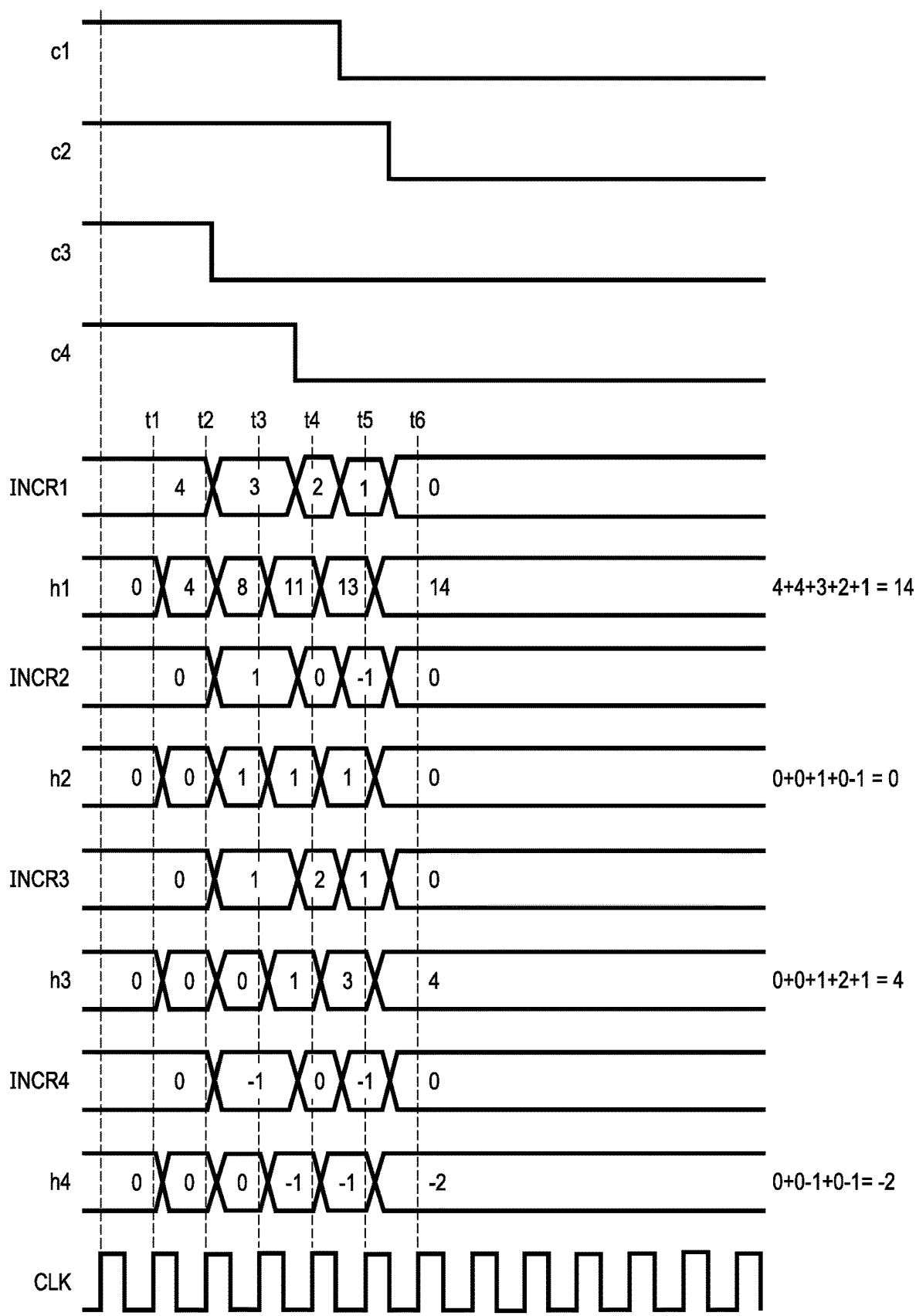
FIG. 2B shows an example waveform diagram of the signals involved in the computation performed by the time domain Discrete Transform block (e.g., time domain Walsh Transform block or time domain Haar Wavelet Transform block), according to some embodiments.

FIG. 2B is a waveform diagram of the signals involved in the computation performed by the system 200 over a period of time t1 to t6, according to some embodiments. The increment signals are sampled at the rising edges of the clock cycle, t1, t2, t3, t4, t5, and t6. For the first accumulator, at time t1, the increment signal INCR1 is sampled with the value 4, and the frequency domain signal h1 accumulated by the first accumulator is 4 (0+4=4). At time t2, the increment signal INCR1 is sampled with the value 4, and the frequency domain signal h1 accumulated by the first accumulator is 8 (4+4=8). At time t3, the increment signal INCR1 is sampled with the value 3, and the frequency domain signal h1 accumulated by the first accumulator is 11 (8+3=11). At time t4, the increment signal INCR1 is sampled with the value 2, and the frequency domain signal h1 accumulated by the first accumulator is 13 (11+2=11). At time t5, the increment signal INCR1 is sampled with the value 1, and the frequency domain signal h1 accumulated by the first accumulator is 14 (13+1=14). At time t6, the increment signal INCR1 is sampled with the value 0, and the frequency domain signal h1 accumulated by the first accumulator is 14 (14+0=14).

Similarly, for the second accumulator, at time t1, t2, t3, t4, t5, and t6, the increment signal INCR2 is sampled with the values 0, 0, 1, 0, −1, 0, respectively. The corresponding frequency domain signal h2 accumulated by the second accumulator is 0, 0, 1, 1, 0, and 0, respectively. For the third accumulator, at time t1, t2, t3, t4, t5, and t6, the increment signal INCR3 is sampled with the values 0, 0, 1, 2, 1, 0, respectively. The corresponding frequency domain signal h3 accumulated by the third accumulator is 0, 0, 1, 3, 4, and 4, respectively. For the fourth accumulator, at time t1, t2, t3, t4, t5, and t6, the increment signal INCR4 is sampled with the values 0, 0, −1, 0, −1, 0, respectively. The corresponding frequency domain signal h4 accumulated by the fourth accumulator is 0, 0, −1, −1, −2, and 0, respectively.

As explained above, the Walsh Transform itself is mathematically reversible and lossless. With a time domain Walsh Computing block (such as the system 200 shown in FIG. 2A), there is no inherent compression aside from the potentially sparser signal representation. But such potentially sparser signal representation is signal dependent. Quantization of the Walsh Transform result would require additional digital circuit(s).

In conventional systems, Walsh coefficient quantization would normally be performed using dedicated arithmetic blocks to implement the following computation:

$$Q_{result} = \text{round}\left(\frac{h}{q}\right)$$

Here, h is the transformed Walsh coefficient (i.e., the frequency domain signal), q is a quantization factor, and $Q_{result}$ is the final quantized coefficient. There are drawbacks of the conventional systems. The conventional systems require initially acquiring the input signals at high quality. The conventional systems also require the division operation and the rounding operation shown in the equation above, which significantly impact the system complexity and the system performance.

To further improve the Walsh Transform coefficient quantization for compression, this disclosure utilizes the time domain Discrete Transform block (e.g., the system 200) described above. Within the time domain Discrete Transform block (e.g., time domain Walsh Transform block or time domain Haar Wavelet Transform block), the accumulators integrate the increment signals at a certain given system clock rate. Each accumulator corresponds to one frequency component (e.g., one frequency domain signal component). Knowing that the different frequency components have a different level of importance in reconstructing the original signals, less important signals can be quantized more coarsely. Such improvement can be achieved by clocking less important accumulators at lower system clock rates. Further, an individual accumulator can even be turned off (effectively clocked at the 0 system clock rate) for not capturing the information in the corresponding input signals at all.

Figure 3:
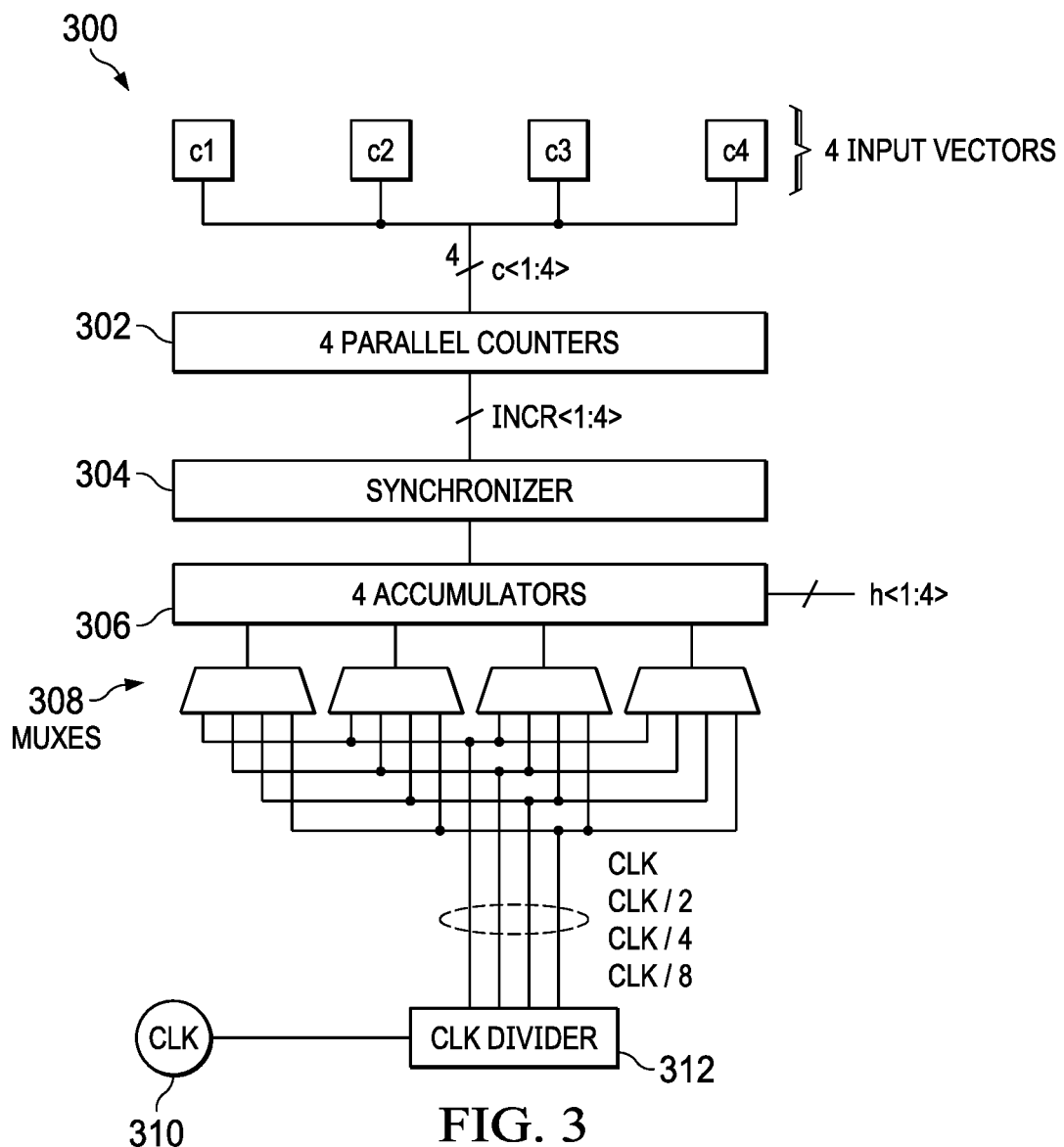
FIG. 3 illustrates a time domain Discrete Transform block (e.g., time domain Walsh Transform block or time domain Haar Wavelet Transform block) with coefficient quantization for compression.

FIG. 3 shows a system 300 as the time domain Discrete Transform block (e.g., time domain Walsh Transform block or time domain Haar Wavelet Transform block) with coefficient quantization for compression, according to some embodiments. The system 300 comprises multiple parallel counters 302, a synchronizer 304, multiple accumulators 306, multiple multiplexors 308, a system clock 310, and a clock divider 312. The number of the parallel counters 302, the number of the accumulators 306, and the number of the multiplexors 308 depend on the number of the parallel input signals. For example, the system 300 for processing N parallel input signals require N parallel counters 302, N accumulators 306, and up to N multiplexors 308. The number of multiplexors 308 can be less than N when two or more multiplexors share the same clock rate.

FIG. 3 shows 4 parallel input signals, such as 4 parallel pulse width signals c1, c2, c3, and c4 (the same as FIG. 2A). So, the system 300 comprises 4 parallel counters 302, 4 accumulators 306, and 4 multiplexors 308. FIG. 3 provides a non-limiting example embodiment system 300 for processing 4 parallel input signals. If there are 8 (or 16) parallel input signals, the system 300 may comprise 8 (or 16) parallel counters, 8 (or 16) accumulators, and 8 (or 16) multiplexors, and so on.

In FIG. 3, the parallel counters 302 may be designed the same and perform the same functions as the parallel counters 202 as described with respect to FIG. 2A. The synchronizer 304 may be designed the same and perform the same functions as the synchronizer 204 as described with respect to FIG. 2A. The accumulators 306 may and perform the same functions (e.g., integration) as the accumulators 206 as described with respect to FIG. 2A. In addition, each of the accumulators 306 may further quantize the corresponding one of the frequency domain signals h1, h2, h3, and h4 with different resolution/accuracy/quality by selecting a different clock rate supplied to the accumulator. That is, each of the accumulators 306 may take a separate clock rate as an additional input fed by a corresponding multiplexor of the multiplexors 308, For example, the system clock 310 may have the system clock rate of CLK. The clock rate divider 312 may set the clock rate for the frequency domain signals h1, h2, h3, and h4 with CLK, CLK/2, CLK/4, and CLK/8, respectively. The different clock rates are supplied to each corresponding accumulator of the accumulators 306 through a corresponding multiplexor of the multiplexors 308 for quantization. Hardware and circuitry for the clock rate divider and the multiplexor are well known to the people skilled in the art.

For instance, the clock rate CLK may be fed to the first accumulator of the accumulators 306, the clock rate CLK/2 may be fed to the second accumulator of the accumulators 306, the clock rate CLK/4 may be fed to the third accumulator of the accumulators 306, and the clock rate CLK/8 may be fed to the fourth accumulator of the accumulators 306. In turn, the accumulators 306 may effectively quantize the frequency domain signals h1, h2, h3, and h4 into the quantized frequency domain signals h1, $$\text{round}\left(\frac{h2}{2}\right), \text{round}\left(\frac{h3}{4}\right), \text{and round}\left(\frac{h4}{8}\right),$$

respectively. In general, the clock rates do not need to be limited to the factors of 2.

FIG. 3 illustrates the time domain Discrete Transform block (e.g., time domain Walsh Transform block or time domain Haar Wavelet Transform block) with coefficient quantization for compression. The disclosed technique selectively controls the quantization accuracy of individual time domain computed Walsh Transform coefficients by reducing the clock rates of corresponding accumulators. By appropriately selecting the frequency components for which to reduce the clock rate, which is signal property dependent, the original signals can be faithfully reconstructed from a fewer total number of bits. In so doing, signal compression can be performed immediately during capture time, which leads to lower storage requirement and lower transmission requirement. The quantization level can be flexibly selected based on the clocking frequency (i.e., clock rate). Lower clocking frequency also results in lower power consumption. Compression severity and quality can also be controlled by setting different clock rates. The reconstructed signal quality can track the energy required to acquire the signal, which allows for energy and quality scaling.

The time domain Discrete Transform block (e.g., time domain Walsh Transform block or time domain Haar Wavelet Transform block) as illustrated in FIGS. 2 and 3 can be used for image compression. Images of real scenes are characteristically sparse when represented in the frequency domain, containing large areas of low frequency signals (smooth gradients) and local high frequency signals (edges). Such characteristics allow for image compression if the signals associated with an image are transformed, for example, using the Discrete Cosine Transform (DCT) as in the JPEG standard.

An image sensor can produce a large amount of data which is costly to store or transmit in terms of storage space or transmission resources. In general, the sooner the image data is compressed, the higher the overall savings for the storage space or the transmission resources. Accordingly, compressing the image at readout stage could significantly save power/die area for all subsequent stages of the image processing/transmission.

Image compression can be a computationally and energetically intensive operation. But, image compression is still desirable where the storage space (e.g., memory or hard drive) or the available signal transmission bandwidth is limited. The current popular image compression techniques are designed to reduce the image file size as much as possible while preserving the quality of the images. These current compression techniques often compromise the energy used during compression process. Thus, an improved image compression solution with lower energy consumption is desirable.

To save power at the system level, image compression close to signal generation as much as possible is preferred to reduce power consumption during later stages (e.g., signal storage or signal transmission). So, image compression would work the best when performed on two-dimensional (2D) areas. To generate the data for the image, a rolling shutter sensor needs to expose multiple rows before the compression computations can start, which requires that the first rows be stored somewhere.

This disclosure also provides an image sensor readout device implementing the Walsh Transform based compression. According to embodiments, pixels can be designed to output pulse width signals which are dependent on the light level. The image sensor readout embodiments are compatible with a time domain Discrete Transform based compressor, such as the systems 200 and 300 as described with respect to FIGS. 2 and 3. The Walsh Matrix can be expanded to its 2D version to exploit the spatial frequency properties of real images in both directions.

Figure 4:
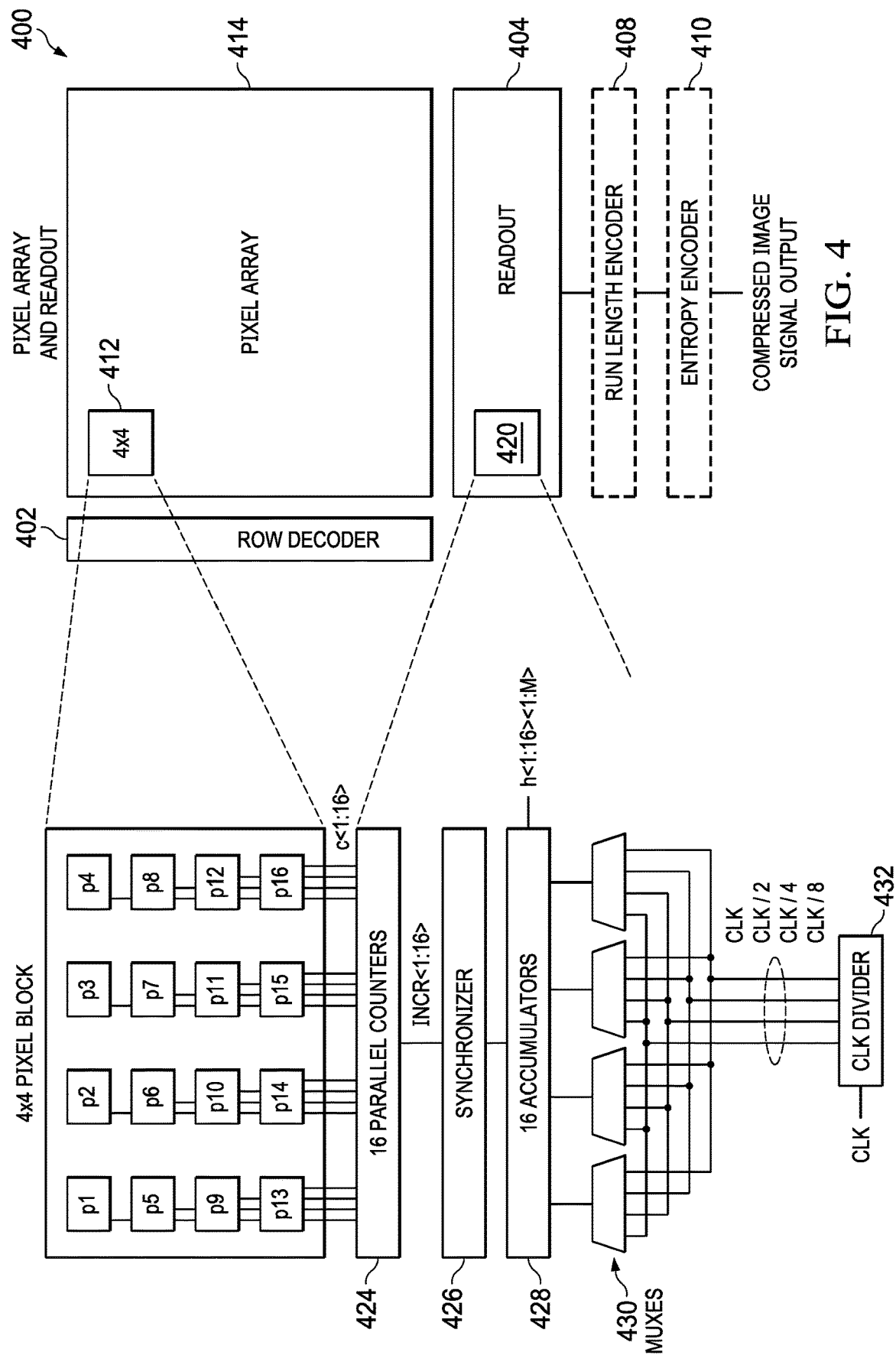
FIG. 4 illustrates an image readout device using a Walsh Transform block to read out a number of pixels simultaneously, according to some embodiments.

FIG. 4 shows a system 400 using a time domain Discrete Transform compression block (e.g., Walsh compression block) to read out a number of pixels simultaneously, according to some embodiments. In FIG. 4, the pixel array is divided into blocks of 4×4 pixels and a row of blocks is read out simultaneously. The pixel blocks are connected to a column level Walsh compression block in a rolling shutter manner. The end result is a block row readout, with 4 rows of pixels read simultaneously, and this process is repeated to read the full pixel array of the image. Using the 4×4 pixel block is for illustration purposes only. The system 400 can be modified to process a 2×2 pixel block, or an 8×8 pixel block. In general, system 400 may be modified to use process N×N pixel block.

The system 400 comprises a row decoder 402 and a readout module 404. The readout module 404 comprises a Walsh compression block 420. The system 400 may additionally comprise a run length encoder 408 and an entropy encoder 410 known in the art.

The pixel array 414 comprises individual pixels of the image sensing element known in the art. The row decoder 402 known in the art may decode a row of 4×4 pixel blocks 412 from the pixel array 414. The 4×4 pixel block 412 includes 16 pixels, p1, p2, p3, ..., and p16. The 16 pixels are input into the Walsh compression block 420. The Walsh compression block 420 comprises, multiple parallel counters 424, a synchronizer 426, multiple accumulators 428, multiple multiplexors 430, and a clock divider 432. The number of the parallel counters 424, the number of the multiple clock gating blocks 426, and the number of the accumulators 428 depend on the number of pixels in the input pixel block. If there are N pixels in the input pixel block, the Walsh compression block 420 may comprise N parallel counters 424, N accumulators 428, and up to N multiplexors.

FIG. 4 shows a 4×4 pixel block for illustration purpose. Comparators known in the art (not shown in FIG. 4) may be used to covert the pixel outputs from the pixel block 412 to pulse width signals. When there are 16 pixels in the pixel block 412, the comparators generate corresponding 16 pulse width signals, c1, c2, c3, ..., and c16 (labeled as c<1:16> in FIG. 4) in the time domain. The parallel counters 424 may be designed the same and perform the same functions as parallel counters 202 and 302 as described with respect to FIGS. 2A and 3. When there are 16 parallel pulse width signals as shown in FIG. 4, the Walsh compression block 420 comprises 16 parallel counters 424 for generating 16 increment signals (labeled as INCR<1:16> in FIG. 4), using the 16×16 Walsh matrix. The accumulators 428 may be designed the same and perform the same function as the accumulators 206 in FIG. 2A, or as the accumulators 306 in FIG. 3. When there are 16 increment signals (labeled as INCR<1:16> in FIG. 4), the Walsh compression block 420 comprises 16 accumulators for generating 16 frequency domain signals h1, h2, h3, ..., h 16 (labeled as h<1:16> in FIG. 4). The Walsh compression block 420 may support coefficient quantization. The accumulators 428 can generate the quantized frequency domain signals. If the system 400 comprises the run length encoder 408 and the entropy encoder 410, the output of the Walsh compression block 420 (frequency domain signals or quantized frequency domain signals) may be further compressed by these two encoders. The output of the system 400 is the compressed image signal output to be saved or transmitted by an output module (not shown in FIG. 4). The output module may be one known in the art for storing information locally on the device (on a hard drive or memory of the device). The output module may be one known in the art for transmitting information remotely over a network. The compressed image signal may be encoded frequency domain signals h1, h2, h3, . . . , h 16 with the run length encoder 428 and the entropy encoder 410. The compressed image signal may also be frequency domain signals h1, h2, h3, . . . , h 16 without being encoded by the run length encoder 408 and the entropy encoder 410.

FIG. 4 shows a readout for an image sensor array, implementing a time domain based, Walsh Transform block 420 on 2D sub-areas of the image. 4×4 (or 2×2, or 8×8) pixels are read out in parallel and compressed at the same time, reducing the amount of data to be transferred to a storage medium (e.g., a memory or a hard drive) or to be transmitted to another device. In so doing, a smaller and more efficient representation of the image is achieved at a stage as close to signal generation stage as possible.

With the disclosed technique as shown in FIG. 4, a compressed image representation is available directly after readout, which would require less processing before storage or transmission. Less processing before storage or transmission results in lower power consumption and/or lower signal bandwidth requirement. The block-row readout technique disclosed with respect to FIG. 4 means that the image does not need to be stored in memory first and later retrieved for compression.

Figure 5:
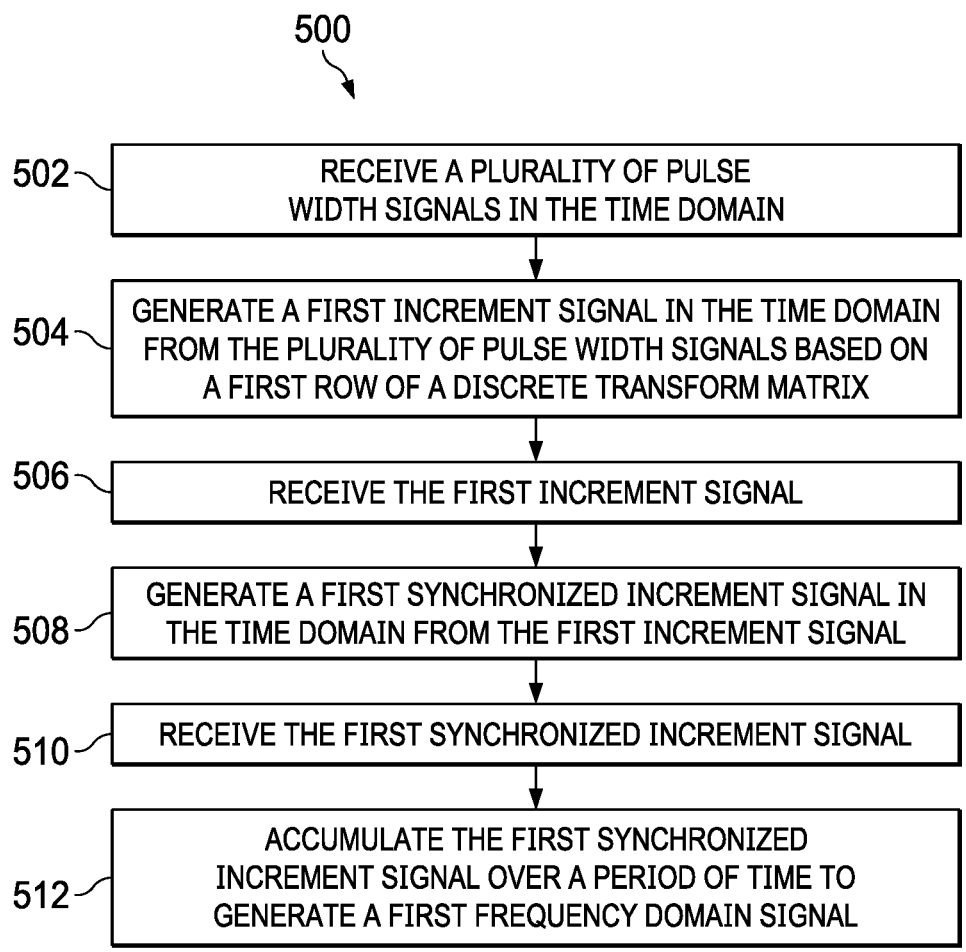
FIG. 5 illustrates a flow chart of a method for performing time domain Discrete Transform, according to some embodiments.

FIG. 5 shows a flow chart of a method 500 for performing time domain Discrete Transform, according to some embodiments. The method 500 may be performed by a hard device, such as the system 200 or the system 300 described above. The method 500 starts at the operation 502, where a first counter of a plurality of counters of an apparatus receives a plurality of pulse width signals in the time domain. At the operation 504, the first counter generates a first increment signal in the time domain from the plurality of pulse width signals based on a first row of a Discrete Transform matrix. At the operation 506, a synchronizer of the apparatus receives the first increment signal. At the operation 508, the synchronizer generates a first synchronized increment signal in the time domain from the first increment signal. At the operation 510, a first accumulator of a plurality of accumulators of the apparatus receives the first synchronized increment signal. At the operation 512, the first accumulator accumulates the first synchronized increment signal over a period of time to generate a first frequency domain signal.

In some embodiments, the plurality of counters may further comprise a second counter. The second counter may receive the plurality of pulse width signals in the time domain. The second counter may then generate a second increment signal in the time domain from the plurality of pulse width signals based on a second row of the Discrete Transform matrix. The synchronizer may receive the second increment signal. The synchronizer may then generate a second synchronized increment signal in the time domain from the second increment signal. The plurality of accumulators may further comprise a second accumulator. The second accumulator may receive the second synchronized increment signal. The second accumulator may then accumulate the second synchronized increment signal over the period of time to generate a second frequency domain signal.

In some embodiments, the number of the plurality of pulse width signals may equal a number of the plurality of counters. The plurality of counters may include N counters including the first counter, and an i-th counter of the plurality of counters may receive the plurality of pulse width signals in the time domain. The i-th counter may generate an i-th increment signal in the time domain from the plurality of pulse width signals based on an i-th row of the Discrete Transform matrix. The Discrete Transform matrix may be an N×N Discrete Transform matrix. The synchronizer may receive the i-th increment signal. The synchronizer may generate an i-th synchronized increment signal in the time domain from the i-th increment signal. The plurality of accumulators may further comprise N accumulators including the first accumulator. An i-th accumulator of the N accumulators may receive the i-th synchronized increment signal. The i-th accumulator may then accumulate the i-th synchronized increment signal over the period of time to generate an i-th frequency domain signal.

In some embodiments, the number of the plurality of counters may equal one of 4, 8, or 16. In some embodiments, the plurality of counters may process the plurality of pulse width signals in parallel. In some embodiments, the number of the plurality of counters may equal 4. The first row of the Discrete Transform matrix may be [1, 1, 1, 1]. The plurality of pulse width signals may comprise a first pulse width signal, a second pulse width signal, a third pulse width signal, and a fourth pulse width signal. The first increment signal may comprise an addition of the first pulse width signal, the second pulse width signal, the third pulse width signal, and the fourth pulse width signal in the time domain.

In some embodiments, the apparatus may further comprise a clock divider. The divider may set a first clock rate. The first clock rate may be a first fraction of a system clock rate. The clock divider may feed the first clock rate to the first accumulator through a first multiplexor. In some embodiments, the plurality of accumulators may further comprise N accumulators including the first accumulator. The clock divider may set an i-th clock rate. The i-th clock rate may be an i-th fraction of the system clock rate for an i-th accumulator of the N accumulators. The clock divider may feed the i-th clock rate to the i-th accumulator through an i-th multiplexor.

In some embodiments, the Discrete Transform matrix may be one of a Walsh matrix, or a Haar matrix.

Figure 6:
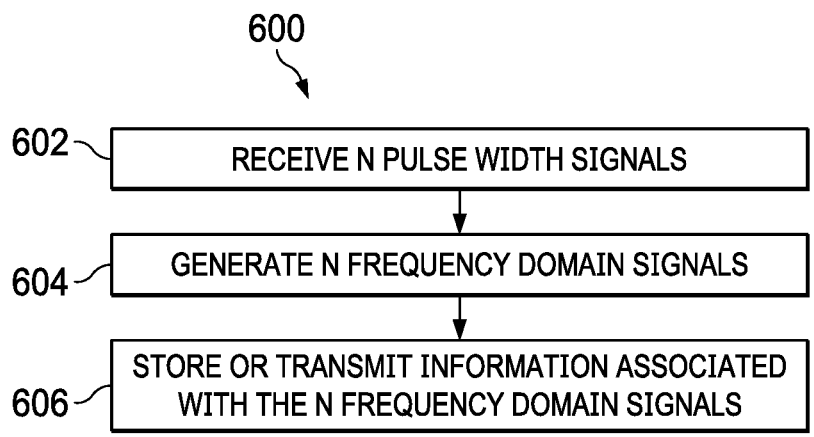
FIG. 6 illustrates a flow chart of a method for performing image sensor readout using the Discrete Transform based compression, according to some embodiments.

FIG. 6 shows a flow chart of a method 600 for performing image sensor readout using the Discrete Transform based compression, according to some embodiments. The method 600 may be performed by a hard device, such as the system 400 described above. The method 600 starts at the operation 602, where a time domain Discrete Transform block of an apparatus receives N pulse width signals. At the operation 604, the time domain Discrete Transform block generates N frequency domain signals. At the operation 606, an output module of the apparatus stores or transmits information associated with the N frequency domain signals.

In some embodiments, the information associated with the N frequency domain signals may be the N frequency domain signals.

In some embodiments, the apparatus may further comprise a run length encoder. The run length encoder may run length encode the N frequency domain signals to generate run length encoded signals. The apparatus may further comprise an entropy encoder. The entropy encoder may entropy encode the run length encoded signals to generate entropy encoded signals. The information associated with the N frequency domain signals may be the entropy encoded signals.

In some embodiments, the N frequency domain signals may be N quantized frequency domain signals.

In some embodiments, the time domain Discrete Transform block may comprise N counters. An i-th counter of the N counters may receive the N pulse width signals in the time domain. The i-th counter of the N counters may generate an i-th increment signal in the time domain from the N pulse width signals based on an i-th row of a Discrete Transform matrix. The Discrete Transform matrix may be an N×N Discrete Transform matrix.

In some embodiments, the time domain Discrete Transform block may further comprise a synchronizer. The synchronizer may receive the i-th increment signal. The synchronizer may generate an i-th synchronized increment signal in the time domain from the i-th increment signal. The time domain Discrete Transform block may further comprise N accumulators. An i-th accumulator of the N accumulators may receive the i-th synchronized increment signal. The i-th accumulator of the N accumulators may accumulate the i-th synchronized increment signal over a period of time to generate an i-th frequency domain signal.

In some embodiments, N may be one of 4, 8, or 16. In some embodiments, the apparatus may comprise a plurality of N comparators. The plurality of N comparators may receive outputs from N pixels and generate the N pulse width signals from the N pixels.

In some embodiments, the apparatus may be an image sensor readout device.

Figure 7A:
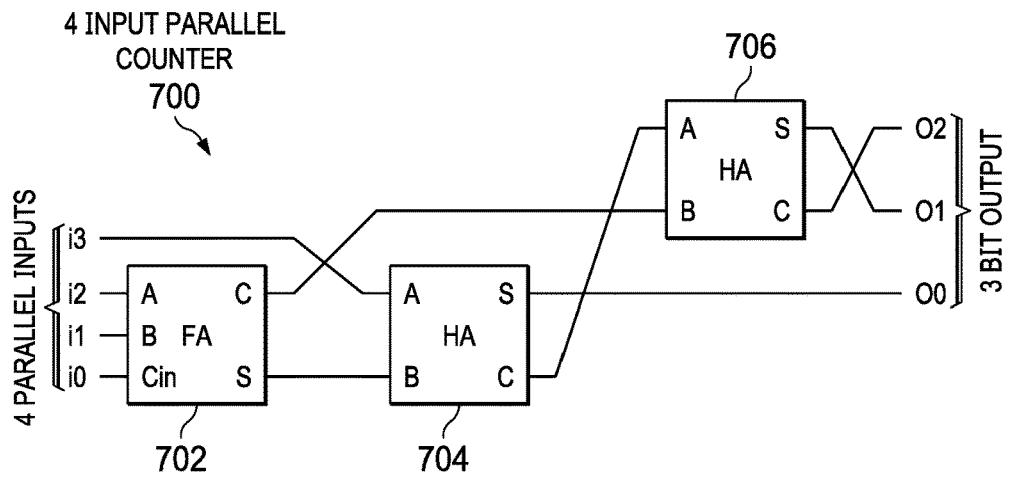
FIGS. 7A-7B illustrate block diagrams of the 4-input counters used in this disclosure, according to some embodiments.
Figure 7B:
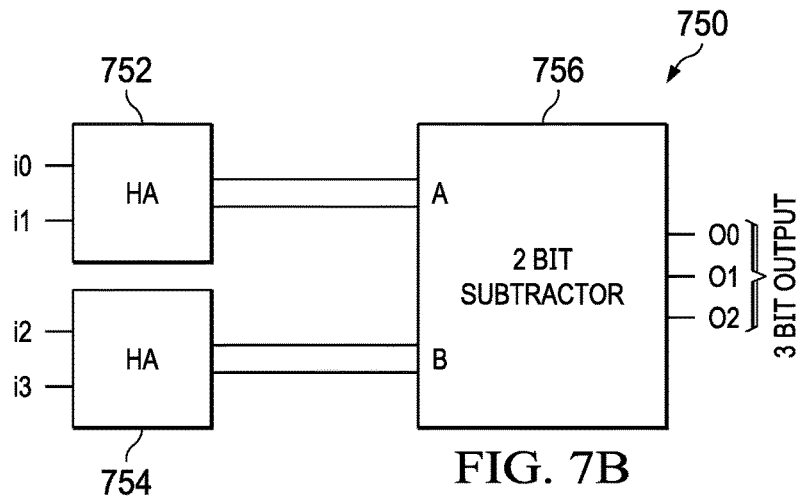

FIGS. 7A-7B shows more detailed block diagrams of the 4-input counters used in this disclosure, according to some embodiments. FIG. 7A shows one example 4-input counter 700 used as the first counter corresponding to the first row of the 4×4 Walsh matrix [1 1 1 1], as described with respect to FIGS. 2A, 3, and 4. The 4-input counter 700 receives 4 input signals i0, i1, i2, and i3 (e.g., pulse width signals c1, c2, c3, and c4, respectively). The 4-input counter 700 generates the increment signal INCR1 as a 3-bit (O0, O1, and O2, and O3) output, which represents i0+i1+i2+i3. The 4-input counter 700 includes the full adder 702. The 4-input counter 700 further includes the half adders 704 and 706. These adders are connected as shown as shown in FIG. 7A. Hardware implementations of the full adder and the half adder are known in the art.

A half adder, such as the half adder 704 and the half adder 706, adds two binary numbers A and B to produce a sum S and a carry output C. The truth table of the half adder is shown below.

| Half Adder Truth Table | | | |
|---|---|---|---|
| A | B | S | C |
| 0 | 0 | 0 | 0 |
| 0 | 1 | 1 | 0 |
| 1 | 0 | 1 | 0 |
| 1 | 1 | 0 | 1 |

A full adder, such as the full adder 702, is a logical circuit that performs an addition operation on three one-bit binary numbers (A, B and the carry input Cin). The outputs of the full adder are a sum S and a carry output C. The truth table of the full adder is shown in the table below.

| Full Adder Truth Table | | | | |
|---|---|---|---|---|
| A | B | Cin | C | S |
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

FIG. 7B shows one example 4-input counter 750 used as an subsequent counter corresponding to a subsequent row of the 4×4 Walsh matrix, as described with respect to FIGS. 2A, 3, and 4. The 4-input counter 750 receives 4 input signals i0, i1, i2, and i3. The 4-input counter 750 generates the increment signal as a 3-bit (O0, O1, and O2) output, which represents i0+i1−i2−i3. The 4-input counter 750 includes the half adders 752 and 754. The 4-input counter 750 further includes a 2-bit subtractor 756 known in the art. These components are connected as shown in FIG. 7B. The 2-bit subtractor 756 receives A and B as the inputs, and the output of the 2-bit subtractor is A-B, represented by the 3-bit (O0, O1, and O2) output. The 4-input counter 750 may be implemented for any of the subsequent counters (i.e., the counters corresponding to the second, the third, or the fourth row of the 4×4 Walsh matrix).

The pulse width signals that correspond to "1" entries may be the input signals i0 and i1, respectively. The pulse width signals that correspond to "−1" entries may be the input signals i2 and i3, respectively. For example, for the second counter corresponding to the second row of the 4×4 Walsh matrix, [1 −1 1 −1], c1 and c3 may be the input signals i0 and i1, respectively, and C2 and c4 may be the input signals i2 and i3, respectively, for generating the increment signal INCR2 (c1+c3−c2−c4). For the third counter corresponding to the third row of the 4×4 Walsh matrix, [1 1 −1 −1], c1 and c2 may be the input signals i0 and i1, respectively, and c3 and c4 may be the input signals i2 and i3, respectively, for generating the increment signal INCR3 (c1+c2−c3−c4). For the fourth counter corresponding to the fourth row of the 4×4 Walsh matrix, [1 −1 −1 1], c1 and c4 may be the input signals i0 and i1, respectively, and c2 and c3 may be the input signals i2 and i3, respectively, for generating the increment signal INCR3 (c1+c4−c2−c3).

Figure 8B:
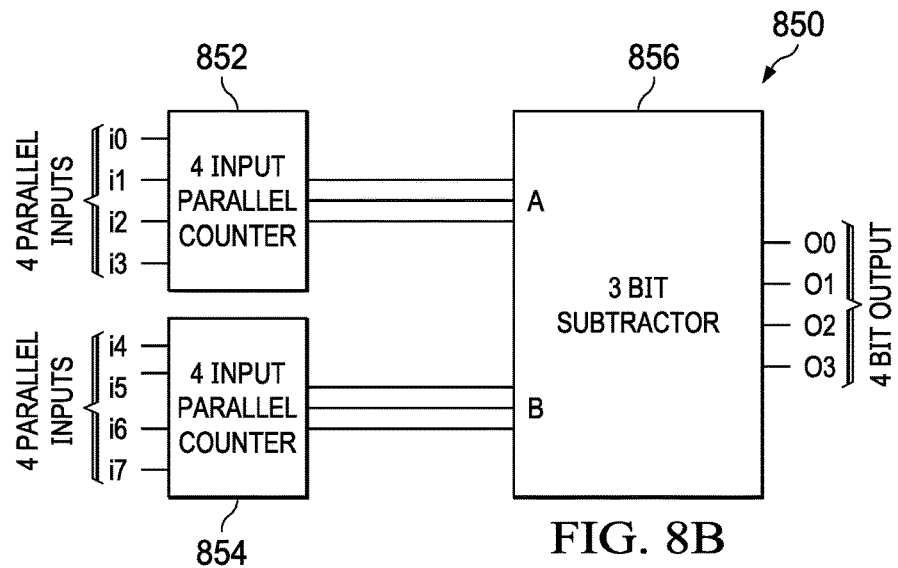
FIGS. 8A-8B illustrates block diagrams of the 8-input counters used in this disclosure, according to some embodiments.
Figure 8A:
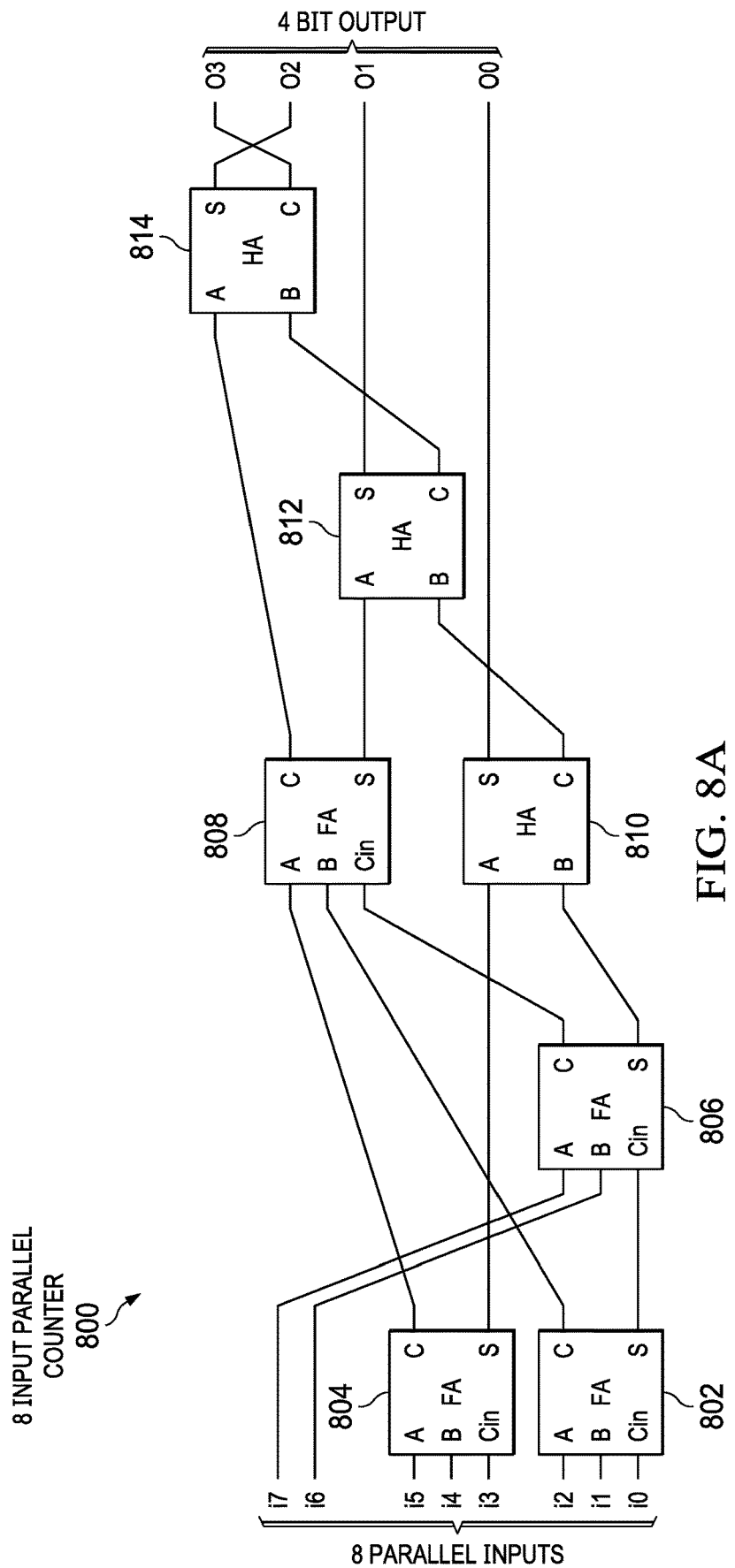

FIGS. 8A-8B shows more detailed block diagrams of the 8-input counters used in this disclosure, according to some embodiments. FIG. 8A shows one example 8-input counter 800 used as the first counter corresponding to the first row of the 8×8 Walsh matrix [1 1 1 1 1 1 1 1], as described with respect to FIGS. 2A, 3, and 4. The 8-input counter 800 receives 8 input signals i0, i1, i2, i3, i4, i5, i6, and i7 (e.g., pulse width signals c1, c2, c3, c4, c5, c6, c7, and c8, respectively). The 8-input counter 800 generates the increment signal INCR1 as the 4-bit output (O0, O1, O2, and O3). The 8-input counter 800 includes the full adders 802, 804, 806, and 808. The 8-input counter 800 further includes the half adders 810, 812, and 814. These adders are connected as shown in FIG. 8A.

FIG. 8B shows one example 8-input counter 850 used as an subsequent counter corresponding to a subsequent row of the 8×8 Walsh matrix, as described with respect to FIGS. 2A, 3, and 4. The 8-input counter 850 receives 8 input signals i0, i1, i2, i3, i4, i5, i6, and i7. The 8-input counter 850 generates the increment signal as a 4-bit (O0, O1, O2, and O3) output, which represents i0+i1+i2+i3−i4−i5−i6−i7. The 8-input counter 850 includes the 4-input counters 852 and 854. The 4-input counters 852 and 854 may be implemented the same as the 4-input counter 700, as described with respect to FIG. 7A. The 8-input counter 850 further includes a 3-bit subtractor 856 known in the art. These components are connected as shown in FIG. 8B. The 3-bit subtractor 856 receives A and B as the inputs, and the output of the 3-bit subtractor is A-B, represented by the 4-bit (O0, O1, O2, and O3) output. The 8-input counter 850 may be implemented for any of the subsequent counters (i.e., the counters corresponding to the second, the third, the fourth, . . . , or the 8th row of the 8×8 Walsh matrix).

The pulse width signals that correspond to "1" entries may be the input signals i0, i1, i2, and i3, respectively. The pulse width signals that correspond to "−1" entries may be the input signals i4, i5, i6, and i7, respectively. For example, for the second counter corresponding to the second row of the 8×8 Walsh matrix, [1 −1 1 −1 1 −1 1 −1], c1, c3, c5, and c7 may be the input signals i0, i1, i2, and i3, respectively. And, c2, c4, c6, and c8 may be the input signals i4, i5, i6, and i7, respectively, for generating the increment signal INCR2 (c1+c3+c5+c7−c2−c4−c6−c8).

Figure 9A:
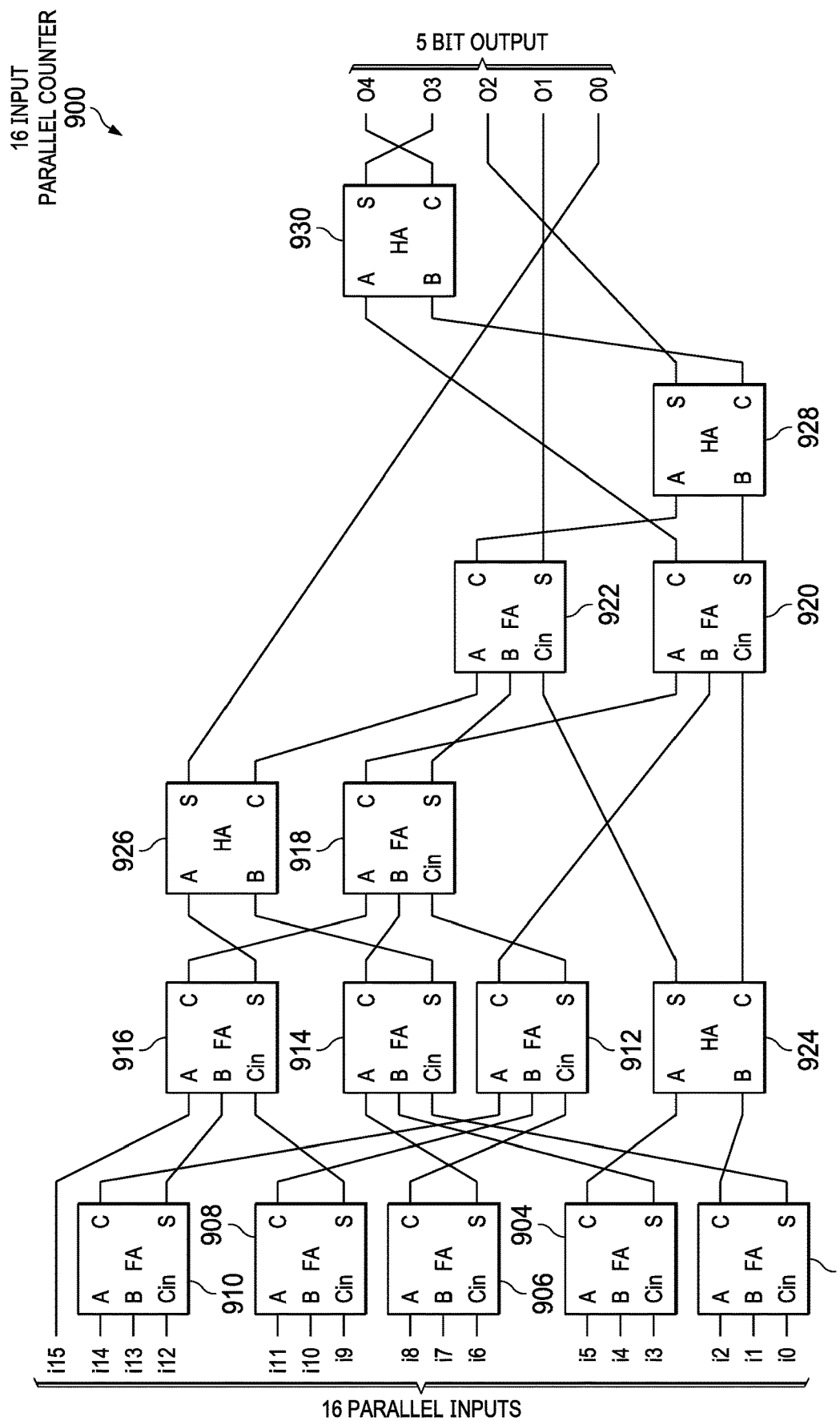
FIGS. 9A-9C illustrate block diagrams of the 16-input counters used in this disclosure, according to some embodiments.
Figure 9B:
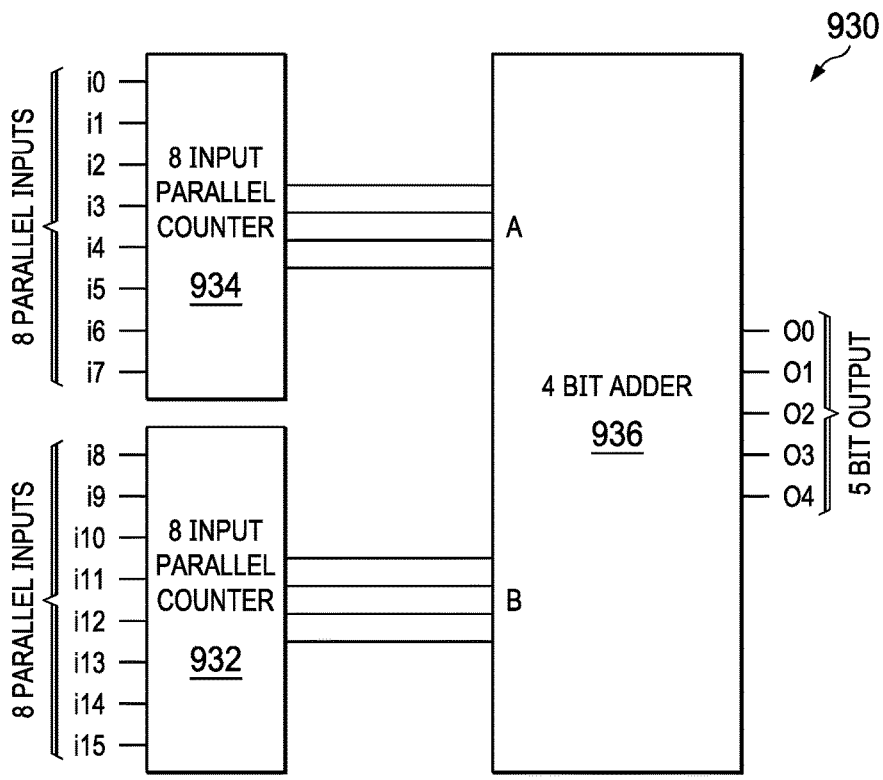
Figure 9C:
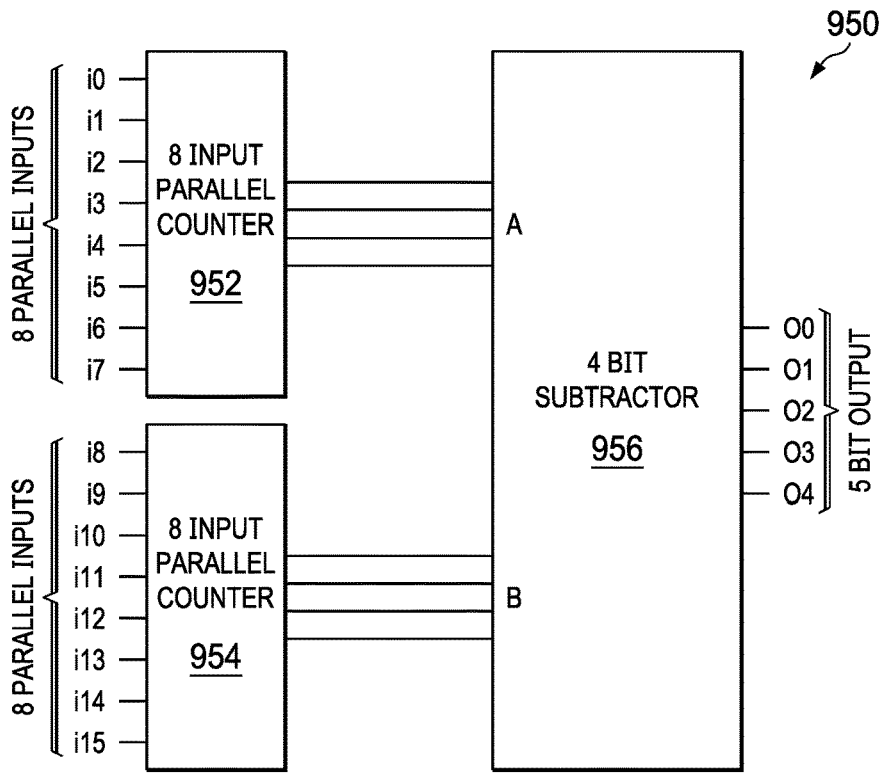

FIGS. 9A-9C shows more detailed block diagrams of the 16-input counters used in this disclosure, according to some embodiments. FIG. 9A shows one example 16-input counter 900 used as the first counter corresponding to the first row of the 16×16 Walsh matrix [1 1 1 1 1 1 1 1 1 1 1 1 1 1 1 1], as described with respect to FIGS. 2A, 3, and 4. The 16-input counter 900 receives 16 input signals i0, i1, i2, i3, i4, i5, i6, i7, i8, i9, i10, i11, i12, i13, i14, and i15 (e.g., pulse width signals c1, c2, c3, c4, c5, c6, c7, c8, c9, c10, c11, c12, c13, c14, and c15, respectively). The 16-input counter 900 generates the increment signal INCR1 as the 5-bit output (O0, O1, and O2, O3, and O4). The 16-input counter 900 includes the full adders 902, 904, 906, 908, 910, 912, 914, 916, 918, 920, and 922. The 16-input counter 900 further includes the half adders 924, 926, 928, and 930. These adders are connected as shown in FIG. 9A.

FIG. 9B shows another example 16-input counter 930 used as the first counter corresponding to the first row of the 16×16 Walsh matrix [1 1 1 1 1 1 1 1 1 1 1 1 1 1 1 1], as described with respect to FIGS. 2A, 3, and 4. The 16-input counter 930 includes two 8-input counters 932 and 934. The 16-input counter 930 further includes a 4-bit adder 936. Each of the two 8-input counters 932 and 934 may be designed the same as the 8-input counter as described with respect to FIG. 8A. The first 8 input signals (e.g., c1, c2, c3, c4, c5, c6, c7, and c8) of the 16 input signals are the inputs of the 8-input counter 932. The second 8 input signals (e.g., c9, c10, c11, c12, c3, c4, c5, and c16) of the 16 input signals are the inputs of the 8-input counter 934. The 4-bit output of the 8-input counter 934 is the 4-bit input A of the 4-bit adder 936. The 4-bit output of the 8-input counter 932 is the 4-bit input B of the 4-bit adder 936. The 4-bit adder 936 performs addition operation of the two inputs A and B and generates a 5-bit output representing the sum of A and B. Hardware design and implementation of the 4-bit adder are known in the art.

FIG. 9C shows one example 16-input counter 950 used as an subsequent counter corresponding to a subsequent row of the 16×16 Walsh matrix, as described with respect to FIGS. 2A, 3, and 4. The 16-input counter 950 receives 16 input signals i0, i1, i2, i3, i4, . . . , and i15. The 16-input counter 950 generates the increment signal as a 5-bit (O0, O1, O2, O3, and O4) output, which represents i0+i1+i2+i3+i4+i5+i6+i7−(i8+i9+i10+i11+i12+i13+i14+i15). The 16-input counter 950 includes the 8-input counters 952 and 954. The 8-input counters 952 and 954 may be implemented the same as the 8-input counter 800, as described with respect to FIG. 8A. The 16-input counter 950 further includes a 4-bit subtractor 956 known in the art. These components are connected as shown in FIG. 9C. The 4-bit subtractor 956 receives A and B as the inputs, and the output of the 4-bit subtractor is A-B, represented by the 5-bit (O0, O1, O2, O3, and O4) output. The 16-input counter 950 may be implemented for any of the subsequent counters (i.e., the counters corresponding to the second, the third, the fourth, . . . , or the sixteenth row of the 16×16 Walsh matrix).

Similar to the description with respect to FIGS. 7B and 8B, the pulse width signals that correspond to "1" entries may be the input signals i0, i1, i2, i3, . . . , and i7, respectively. The pulse width signals that correspond to "−1" entries may be the input signals i8, i9, i10, i11, . . . , and i15, respectively. For example, for the second counter corresponding to the second row of the 16×16 Walsh matrix, [1 −1 1 −1 1 −1 1 −1 1 −1 1 −1 1 −1 1 −1], c1, c3, c5, c7, c9, c11, c13, and c15 may be the input signals i0, i1, i2, i3, i4, i5, i6, and i7 respectively. And, c2, c4, c6, c8, c10, c12, c4, and c16 may be the input signals i8, i9, i10, i11, i12, 3, 4, and i15, respectively, for generating the increment signal INCR2 below
INCR2=c1+c3+c5+c7+c9+c11+c13+c5−(c2+c4+c6+c8+c10+c12+c4+c16)

Based on the description of the counters as described above, a person skilled in the art would understand that similar design and implementation may apply to the counters for the Haar Wavelet Transform. For example, the counters described with respect to FIGS. 7A, 8A, and 9A may be used as the first counter for the Haar Wavelet Transform, corresponding the first row having all "1" entries. In another example, for a subsequent counter counting 8 input signals, the 8-input counter 850 as described with respect to FIG. 8B may be used. For instance, the 8-input counter 850 may be used for the second counter corresponding to the second row of the 8×8 Haar matrix to generate the increment signal INCR2 (c1+c2+c3+c4−c5−c6−c7−c8). In yet another example, for a subsequent counter counting 4 input signals, the 4-input counter 750 as described with respect to FIG. 7B may be used. For instance, the 4-input counter 750 may be used for the third counter corresponding to the third row of the 8×8 Haar matrix to generate the increment signal INCR3 (c1+c2−c3−c4). For a subsequent counter counting 2 signals, a 1-bit subtractor known in the art may be used. For instance, the 1-bit subtractor may be used for the fifth counter corresponding to the fifth row of the 8×8 Haar matrix to generate the increment signal INCR5 (c1−c2).

To provide a more detailed context of the counter design and implementation described above, this disclosure incorporates the following article by reference in its entirety.

L. Dadda, Composite Parallel Counters, *IEEE Transactions on Computers*, v. 29 n. 10, p. 942-946, October 1980.

Figure 10:
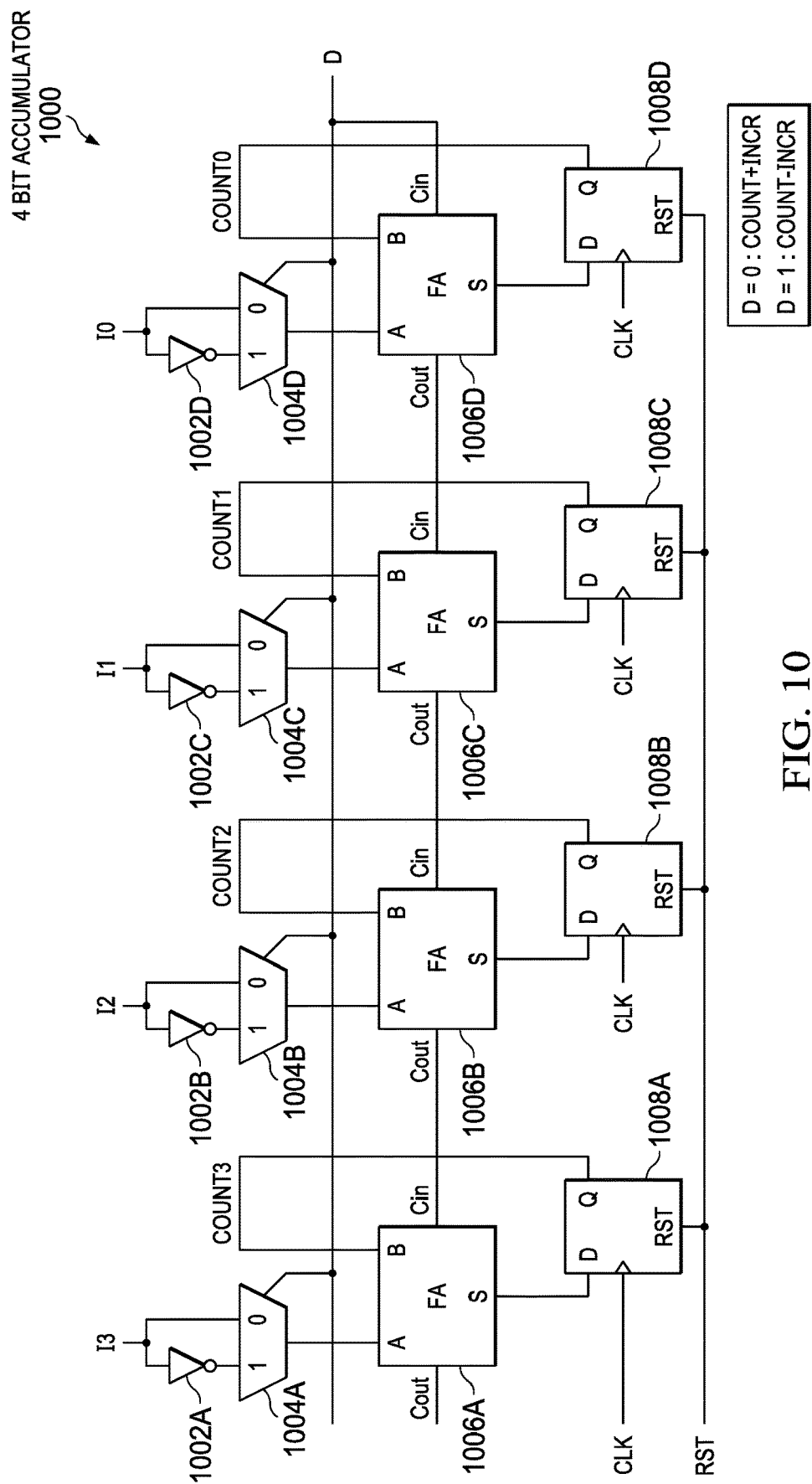
FIG. 10 shows a block diagram of one example embodiment accumulator.

As described above, the accumulator is a standard block known in the art. Hardware implementations of the accumulator may vary. FIG. 10 shows the block diagram of one example embodiment accumulator 1000 that may be implemented for the accumulators 206 in FIG. 2A, the accumulators 306 in FIG. 3, and the accumulators 428 in FIG. 4. The accumulator 1000 comprises the inverters 1002A-D, the multiplexers 1004A-D, the full adders 1006A-D, and the flip flips 1008A-D known in the art. The flip flips 1008A-D may be D flip-flops. A D flip-flop is an edge-triggered memory circuit. The D flip-flop has three inputs: a data input (D) that defines the next state, a timing control input (CLK) that tells the flip-flop exactly when to "memorize" the data input, and a reset input (RST) that can cause the memory to be reset to 0 regardless of the other two inputs (usually referred as asynchronous reset). The output of a D flip-flop is Q.

These components of the accumulator 1000 are connected as shown in FIG. 10. Accumulator 1000 is a 4-bit accumulator receiving an increment signal represented as 4 bits (I0, I1, I2, and I3). The accumulator 1000 counts up or down based on signal D, on each rising clock edge, representing the resulting number in 2's complement binary notation. The output of the accumulator is the accumulated signal D.

Figure 11:
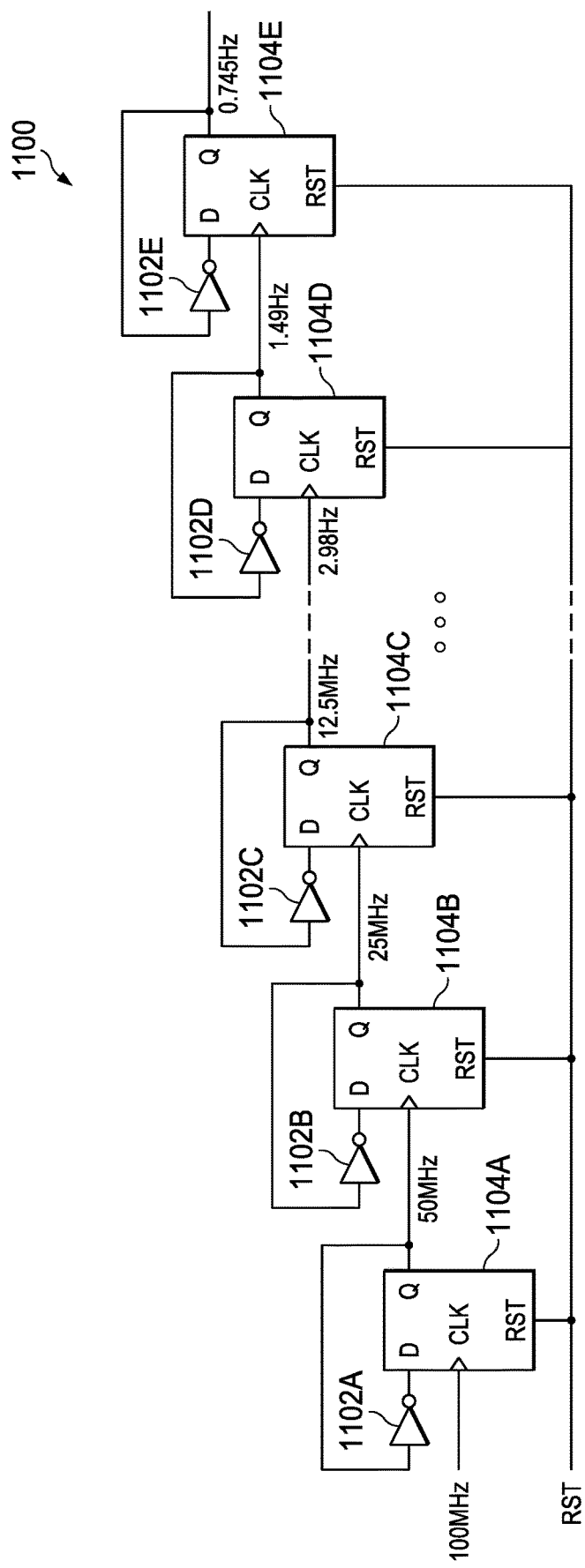
FIG. 11 shows a block diagram of one example embodiment clock divider.

As described above, the clock divider is known in the art. FIG. 11 shows the block diagram of one example embodiment clock divider 1100 that may be implemented for the clock divider 310 in FIG. 3 and the clock divider 432 in FIG. 4. The clock divider 1100 is a D type flip-flop clock divider. The clock divider 1100 comprises inverters 1102A-E and flip-flops 1104A-E, connected as shown in FIG. 11. As described above, the clock rate to each accumulator does not have to be a factor of 2 of the fastest clock. So, other clocking circuits may be used.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. An apparatus, comprising:
   a first counter configured to:
      receive a plurality of pulse width signals in the time domain, and
      generate a first increment signal in the time domain from the plurality of pulse width signals based on a first row of a Discrete Transform matrix;
   a synchronizer configured to:
      receive the first increment signal, and
      generate a first synchronized increment signal in the time domain from the first increment signal; and
   a first accumulator configured to:
      receive the first synchronized increment signal, and
      accumulate the first synchronized increment signal over a period of time to generate a first frequency domain signal.

2. The apparatus of claim 1, further comprising a second counter, the second counter configured to:
   receive the plurality of pulse width signals in the time domain, and
   generate a second increment signal in the time domain from the plurality of pulse width signals based on a second row of the Discrete Transform matrix;
   wherein the synchronizer is further configured to:
   receive the second increment signal, and
   generate a second synchronized increment signal in the time domain from the second increment signal; and
   wherein the apparatus further comprises a second accumulator, the second accumulator configured to:
   receive the second synchronized increment signal, and
   accumulate the second synchronized increment signal over the period of time to generate a second frequency domain signal.

3. The apparatus of claim 1, further comprising N counters, wherein one of the N counters is the first counter, and a number of the plurality of pulse width signals equals N.

4. The apparatus of claim 1, further comprising N counters, wherein one of the N counters is the first counter, and an i-th counter of the N counters is configured to:
   receive the plurality of pulse width signals in the time domain, and
   generate an i-th increment signal in the time domain from the plurality of pulse width signals based on an i-th row of the Discrete Transform matrix, wherein the Discrete Transform matrix is an N×N Discrete Transform matrix;
   wherein the synchronizer is further configured to:
   receive the i-th increment signal, and
   generate an i-th synchronized increment signal in the time domain from the i-th increment signal; and
   wherein the apparatus further comprises N accumulators, one of the N accumulators is the first accumulator, and an i-th accumulator of the N accumulators configured to:
   receive the i-th synchronized increment signal, and
   accumulate the i-th synchronized increment signal over the period of time to generate an i-th frequency domain signal.

5. The apparatus of claim 1, further comprising N counters, wherein one of the N counters is the first counter, and wherein N equals one of 4, 8, or 16.

6. The apparatus of claim 1, further comprising N counters, wherein one of the N counters is the first counter, and wherein the N counters process the plurality of pulse width signals in parallel.

7. The apparatus of claim 1, wherein the first row of the Discrete Transform matrix is [1, 1, 1, 1], wherein the plurality of pulse width signals comprise a first pulse width signal, a second pulse width signal, a third pulse width signal, and a fourth pulse width signal, and wherein the first increment signal comprises an addition of the first pulse width signal, the second pulse width signal, the third pulse width signal, and the fourth pulse width signal in the time domain.

8. The apparatus of claim 1, further comprising:
   a clock divider configured to:
      set a first clock rate, the first clock rate being a first fraction of a system clock rate; and
      feed the first clock rate to the first accumulator through a first multiplexor.

9. The apparatus of claim 8, wherein further comprising N accumulators, wherein one of the N accumulators is the first accumulator, the clock divider further configured to:
   for an i-th accumulator of the N accumulators, set an i-th clock rate, the i-th clock rate being an i-th fraction of the system clock rate, and
   feed the i-th clock rate to the i-th accumulator through an i-th multiplexor.

10. The apparatus of claim 1, wherein the Discrete Transform matrix is one of a Walsh matrix, or a Haar matrix.

11. An apparatus, comprising:
    a time domain Discrete Transform block configured to:
       receive N pulse width signals, and
       generate N frequency domain signals, wherein the time domain Discrete Transform block comprises:
    N counters, wherein an i-th counter of the N counters is configured to:
       receive the N pulse width signals in the time domain, and
       generate an i-th increment signal in the time domain from the N pulse width signals based on an i-th row of a Discrete Transform matrix, wherein the Discrete Transform matrix is an N×N Discrete Transform matrix;
       and
    an output module configured to:
       store or transmit information associated with the N frequency domain signals.

12. The apparatus of claim 11, wherein the information associated with the N frequency domain signals is the N frequency domain signals.

13. The apparatus of claim 11, further comprising:
a run length encoder configured to:
run length encode the N frequency domain signals to generate run length encoded signals; and
an entropy encoder configured to:
entropy encode the run length encoded signals to generate entropy encoded signals, wherein the information associated with the N frequency domain signals is the entropy encoded signals.

14. The apparatus of claim 11, wherein the N frequency domain signals are N quantized frequency domain signals.

15. The apparatus of claim 11, wherein the time domain Discrete Transform block further comprises:
a synchronizer configured to:
receive the i-th increment signal, and
generate an i-th synchronized increment signal in the time domain from the i-th increment signal; and
N accumulators, wherein an i-th accumulator of the N accumulators is configured to:
receive the i-th synchronized increment signal, and
accumulate the i-th synchronized increment signal over a period of time to generate an i-th frequency domain signal.

16. The apparatus of claim 15, wherein the time domain Discrete Transform block further comprises:
a clock divider configured to:
for the i-th accumulator of the N accumulators, set an i-th clock rate, the i-th clock rate being an i-th fraction of a system clock rate, and
feed the i-th clock rate to the i-th accumulator through an i-th multiplexor.

17. The apparatus of claim 16, wherein N is one of 4, 8, or 16.

18. The apparatus of claim 16, further comprising:
a plurality of N comparators configured to:
receive outputs from N pixels, and
generate the N pulse width signals from the N pixels.

19. The apparatus of claim 11, wherein the apparatus is an image sensor readout device.

20. A method comprising:
receiving, by a first counter of an apparatus, a plurality of pulse width signals in the time domain;
generating, by the first counter, a first increment signal in the time domain from the plurality of pulse width signals based on a first row of a Discrete Transform matrix;
receiving, by a synchronizer of the apparatus, the first increment signal;
generating, by the synchronizer, a first synchronized increment signal in the time domain from the first increment signal;
receiving, by a first accumulator of the apparatus, the first synchronized increment signal; and
accumulating, by the first accumulator, the first synchronized increment signal over a period of time to generate a first frequency domain signal.

21. The method of claim 20, the apparatus further comprising N counters, wherein one of the N counters is the first counter, and a number of the plurality of pulse width signals equals N.

22. The method of claim 20, the apparatus further comprising N counters, wherein one of the N counters is the first counter, and wherein N equals one of 4, 8, or 16.

23. The method of claim 20, the apparatus further comprising N counters, wherein one of the N counters is the first counter, wherein the N counters process the plurality of pulse width signals in parallel.

24. The method of claim 20, further comprising:
setting, by a clock divider of the apparatus, a first clock rate, the first clock rate being a first fraction of a system clock rate; and
feeding, by the clock divider, the first clock rate to the first accumulator through a first multiplexor.

* * * * *